Nov. 3, 1936.  G. M. ROSENBLUM  2,059,279
CONTROL FOR RADIO APPARATUS
Filed May 29, 1929  4 Sheets-Sheet 1
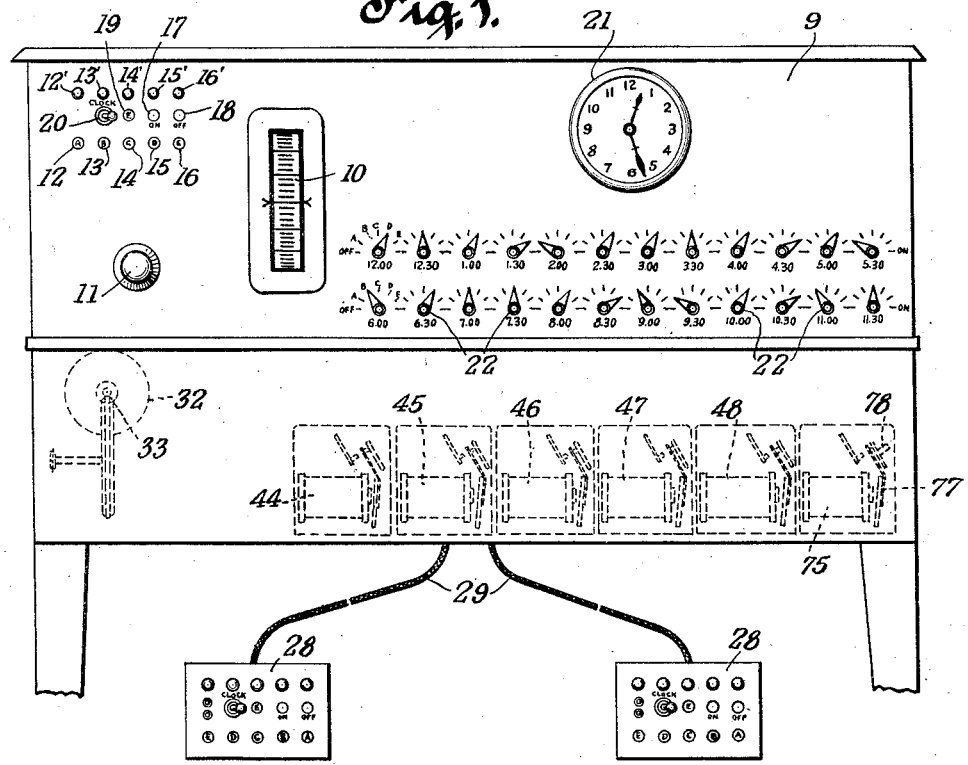
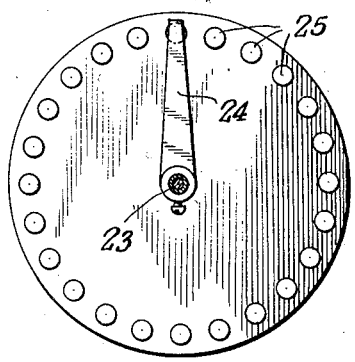
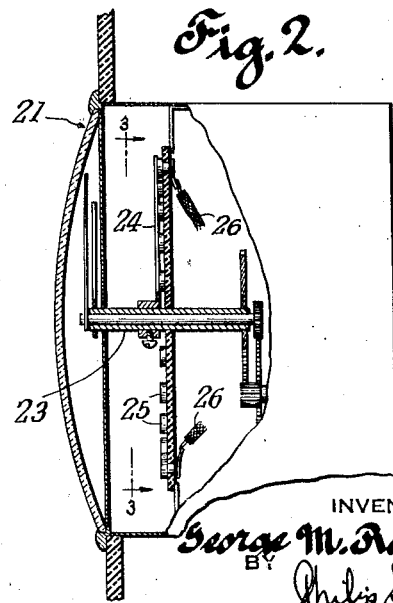
INVENTOR
George M. Rosenblum
BY Philip S. McLean
ATTORNEY

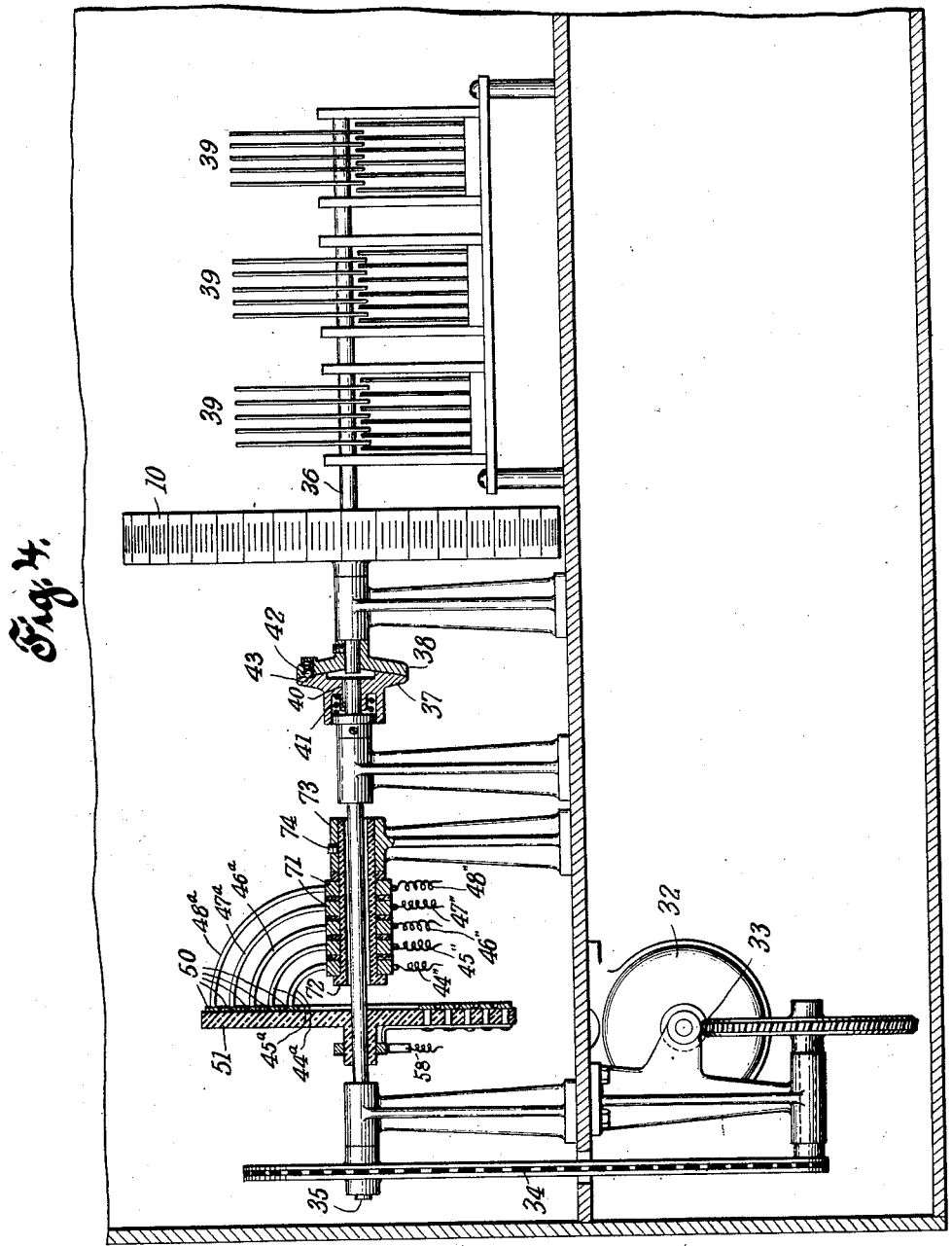

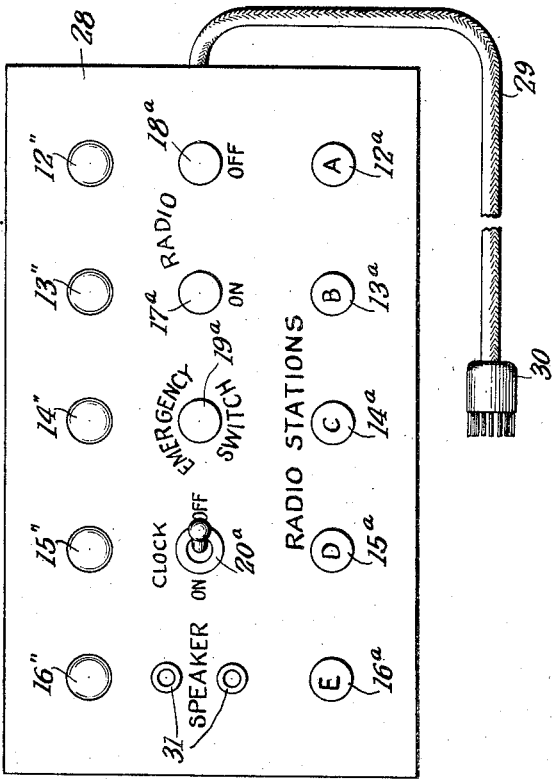
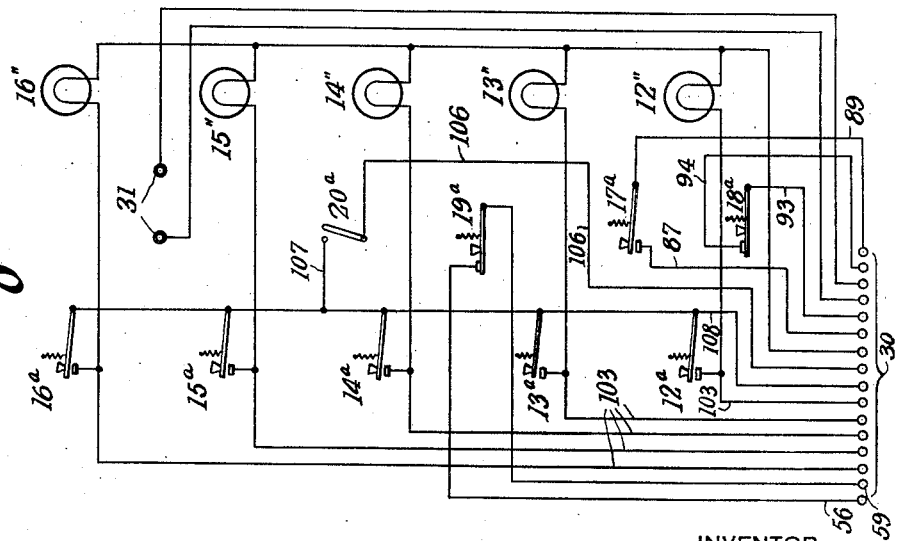

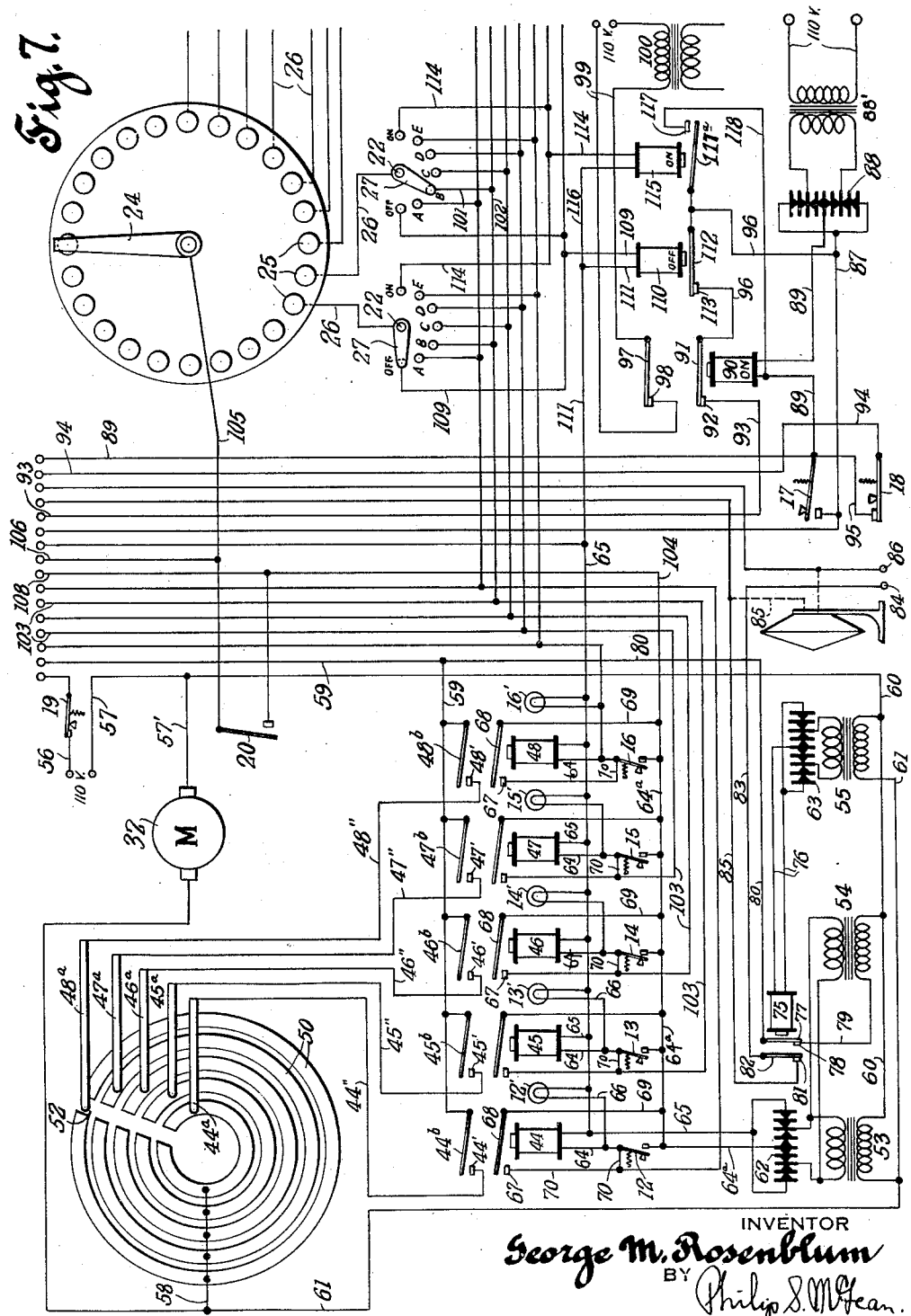

Patented Nov. 3, 1936

2,059,279

UNITED STATES PATENT OFFICE 2,059,279

CONTROL FOR RADIO APPARATUS

George M. Rosenblum, Brooklyn, N. Y., assignor to Radio Corporation of America, New York, N. Y., a corporation of Delaware Application May 29, 1929, Serial No. 366,882

4 Claims. (Cl. 250—20)

This invention relates to the control of radio apparatus, particularly radio receiving sets.

Special objects of the invention are to provide reliable and practical remote control by which a radio receiving set or the like may be turned on and off and different stations be selected at will; to provide at the remote control station means for indicating the selecting operation and for showing to the operator the conditions at the receiving set; to provide in conjunction with the remote control or independently of the same, an outlet or a remote speaker or head set by which the operator may check the operation of the set, or use an additional speaker at a point distant from the set; to provide in conjunction with the above or independently of the same a program determining and selecting device by which the receiving set may be automatically turned on or off at different times and by which different stations can be automatically cut in for selected periods.

Further objects are to accomplish the above in a commercially practical way without resorting to undue complications and to provide arbitrary controls by which the action of the automatic controls may be superseded at will, permitting the radio apparatus then to be handled in the usual or ordinary ways.

The foregoing and other desirable objects are attained in this invention by certain novel features of construction, combination and relations of parts, as set forth in the following specification and broadly covered in the claims.

The drawings accompanying and forming part of the specification, illustrate an embodiment of the invention, but as this illustration is primarily for purposes of disclosure, it should be understood that the structure may be modified in various ways without departure from the true spirit and broad scope of the invention.

Fig. 1 is a broken front view illustrating the apparatus as built into or incorporated with a radio receiving set; Fig. 2 is a broken side view of the clock contact mechanism with the panel and other portions appearing in section; Fig. 3 is a front and part sectional view of the clock contact mechanism as on the plane of line 3—3 of Fig. 2; Fig. 4 is a broken part sectional view showing the motor driven selector mechanism coupled up with the control shaft of the receiving set; Fig. 5 is a front elevation of one of the control panels; Fig. 6 is a diagrammatic view illustrating the wiring of one of these control panels; Fig. 7 is a diagrammatic view illustrating the wiring of the selector switch mechanism, timing switches, etc., the wiring in this view being a continuation of that shown in Fig. 6.

The invention is adapted for use with radio receiving sets generally and therefore the receiving set indicated at 9 in Fig. 1 may be considered of any conventional or special design. This particular set is shown as having a dial or tuning control 10 by which the set may be arbitrarily tuned to select different stations and a suitable volume control 11.

The selection of certain stations may be automatically effected in the construction shown by the station selecting push button switches shown at 12, 13, 14, 15, 16, located on the front of the panel with station indicating signal lamps 12', 13', 14', 15', 16' above the same. The particular set shown is turned on by push button switch 17 and can be turned off by push button switch 18. At one side of these "on" and "off" buttons, there is indicated a so-called emergency switch button 19, the purpose of which will be described later and at one side of the latter, there is indicated a toggle switch 20 for cutting the timing clock into and out of operation.

The timing clock is illustrated at 21 mounted in the face mount in the panel of the receiving set. Below the clock on the face of the panel are the station selecting time switches 22, these being indicated, one for each half hour period of 12 hours, or otherwise stated, one switch for each half hour of a full 12 hours. The time at which each of these switches becomes effective may be indicated on the panel under the switch as shown and the stations which these switches control may be indicated on a scale at each switch as shown. In this particular illustration, five stations, which for example, may be designated A, B, C, D, E, are controlled by each switch, these being the same five stations controlled by the arbitrary selecting push buttons 12, 13, 14, 15, 16.

At each half hour period, the clock 21 automatically cuts in one of the station selecting time switches 22, rendering that particular switch then effective to cut in the station to which it has been turned. These station selecting time switches are indicated as having "off" and "on" positions at the ends of the station scales, so that instead of selecting a station, they may serve simply to cut the receiving set off or to continue it in operation at the station last selected.

The manner in which the station selecting time switches are connected in circuit by the clock will be understood from Figs. 2, 3 and 7, which indicate the hour hand arbor 23 of the clock as carrying a switch arm 24 contacting at each half hour with one of the switch buttons 25 connected by wiring 26 with the contact arms 27 of the respective station selecting time switches 22, (Fig. 7).

The remote control stations indicated in connection with the receiving apparatus in Fig. 1 and shown separately in Figs. 5 and 6, consist each of a suitable panel 28 connected by a cable 29 with the receiving set, said cable usually terminating in a multiple prong plug 30, enabling all the circuits of the remote control station to be plugged in at once into the receiving set.

As shown in the detailed view Fig. 5, each remote control panel carries a set of station selecting push buttons 12a, 13a, 14a, 15a, 16a, a set of signal lights for the same designated 12", 13", 14", 15", 16", radio starting and stopping switches 17a and 18a and an emergency push button 19a and a clock "on" and "off" switch 20a. These controls and indicators are shown arranged in three rows similar to the equivalent controls and indicators on the panel of the radio set.

In addition to the control functions, the remote control panel is utilized as a station extension in the present disclosure by providing it with "phone tip" jacks 31 to receive the contact pins of a speaker or head set cord. This is a special advantage when the remote control station is located a considerable distance from the radio set, enabling the operator to check the operation of the radio set at all times.

The automatic adjustment of the radio set is effected in the present disclosure by an electric motor shown at 32 in Figs. 1, 4, and 7, driving through the reduction gearing, including worm gearing 33 and chain and sprocket gearing 34, a control shaft 35 in line with and coupled up to the tuning condenser shaft 36 by a friction clutch comprising conical clutch elements 37, 38 on the two shafts. The tuning condensers are indicated at 39 all mounted on the same shaft, but it should be understood that these may be separate condensers or be other forms of tuning devices, depending on the type of radio set.

The clutch element 37 is shown as slidingly keyed on the control shaft at 40 and as pressed toward the companion clutch member 38 by spring 41. This construction provides a slip coupling which will yield and prevent injury to any of the parts and which furthermore, will enable independent control of the radio set through the medium of the tuning dial 10 or other customary control. In order that the control shaft and condenser shaft may be turned to a predetermined relation, after the set has been independently operated by means of the tuning dial, the clutch element 38 is shown as having a spring pressed ball 42 seated in the face of the same for cooperation with a vent 43 in the face of the companion clutch member 37, the same providing a feeler by which the operator may know when the dial has been turned far enough to bring the two shaft sections into proper registry. The control mechanism for the motor comprises in the present illustration of a set of motor circuit relays 44, 45, 46, 47, 48, Fig. 7, one for each of the stations A, B, C, D, etc. which the apparatus is to select, having armature contacts 44', 45', 46', 47', 48', connected by wiring 44", 45", 46", 47", 48", with brushes 44a, 45a, 46a, 47a, 48a, Figs. 4 and 7, engaging a contact plate or the segments of a contact plate 50 mounted on the insulated support 51 on the control shaft 35 (Fig. 4) and having a radially extending insulating break 52 (Fig. 7), which will interrupt the motor circuit when it reaches the brush of the relay which has been energized.

The energy for operating the motor, control relays and indicator lights may be taken from the ordinary house lighting circuit. This is accomplished in the present disclosure by using a 110 volt universal motor connected across the line and "step-down" transformers 53, 54, 55, Fig. 7 having their primaries on the 110 volt A. C. circuit and their secondaries connected to feed the relays and lamps.

The two sides of the 110 volt line are designated 56, 57, in Fig. 7 and the line 56 is shown running through a normally closed emergency switch 19 and then continuing as such in Fig. 6 up through another normally closed emergency switch 19a on the remote control panel. One side of the motor is shown connected by a branch 57' with the service wire 57 and the other side of the motor is connected by wiring 58 to the control plate or plate segments 50, from which, return to the other side of the line is effected by one of the brushes 44a, 45a, etc., wiring 44", etc., relay contacts 44' etc., and relay armatures 44b, 45b, 46b, 47b, 48b and wiring 59, through the closed emergency push button 19a, Fig. 6 to the opposite line 56.

The primaries of the transformers 53 and 55 are shown connected in parallel with the motor by wiring 57, 60, 61, and 58, Fig. 7, so as to receive energy from the line when the motor is in operation. The secondaries in these two transformers 53, 55, furnish energy to rectifiers 62, 63, the first of these supplying energy for the selector relays 44 and indicator lights 12', 13', etc. through wiring; one side of which is designated 64a—64 and contains the push button selector switches 12, 13, 14, 15, 16 and the other side of which is designated 65. The indicator lights 12', 13', etc. are shown connected in on these same lines 64, 65 by suitable branch wiring shown at 66.

The selector relays are shown as of the "self-locking" type, so as to render it unnecessary for the operator to hold the push button switch while the motor is effecting the selecting operation. The connections for this purpose include the relatively stationary and movable armature contacts 67, 68 respectively, the armature movable contact being connected by branch wiring 69 with the feed line 64a of the rectifier and the stationary contact 67 being connected by the wiring 70 back into the line 64 at the other side of the selector switches 12, 13, etc., the current returning through the relay and the line 64a back to the rectifier. From this it will be seen that as soon as one of the push buttons 12, 13 is operated to close a circuit through one of the relays 44, 45, etc., said relay will close its own circuit independently of the push buttons which initially close the circiut through the relay and further that this circuit through the relay, will remain closed during the remainder of the period of operation of the motor or until the rotation of the commutator brings the gap or circuit interrupting break therein into register with the brush 44a, etc., of that particular relay. Thus, it will be clear that when a selector push button is operated, the relay for that particular button will be energized, closing the circuit through the motor and holding it closed until the motor has turned the contact disc far enough to bring the break into register for that relay. These brushes are angularly related or offset to determine the movement necessary for bringing in a particular station and hence the motor will stop after it has turned the tuning controls far enough to bring in such stations.

In Fig. 4, the selector brushes 44a, etc., are shown as supported in angularly adjustable relation by having hub portions 71 rotatably engaged in insulated relation upon a common support 72. This support is illustrated as an insulating sleeve concentric with and surrounding the control shaft, being carried by a bracket 73, so that it does not touch said shaft. This sleeve is shown secured stationary in the bracket by a set screw 74. The hub portion 71 of the brushes may be held frictionally on the insulating support or be secured in their adjustable relations thereon by set screws or the like. The purpose of such adjustment, it will be seen, is to enable the brushes to be independently set for different desired stations.

The second rectifier 63, Fig. 7, is provided to energize a restoring relay 75 through direct wiring 76. As transformers 53 and 55 are in parallel, both rectifiers 62 and 63 will come into operation at the same time, the first rectifier furnishing current for the relays and signal lights and the second rectifier 63 energizing relay 75, which by retracting its armature 77 opens a circuit at contact 78, which was closed by wiring 79 through the primary of the transformer 54. The latter is shown connected with feed line 60 and the armature of the relay is shown connected by wiring 80 with wiring 59 of the other side of the line. It will be apparent therefore, that when a push button is operated to effect a station selecting operation, the so-called restoring relay 75 will be energized from transformer 55 and rectifier 63 to immediately break the circuit through primary of transformer 54. Hence, while the motor is operating, the selected relay and signal lamp are energized entirely from transformer 53 and rectifier 62. When the gap in the control disc reaches the brush of that particular relay, the motor circuit is broken, and at the same time the circuit through the selector relay and its signal lamp is opened. Hence, the actuated relay releases its armature and the signal lamp goes out when the motor stops after having completed its station selecting function. As the primary circuit of primary transformer 55 is also broken in this same circuit opening operation, the rectifier 63 is deprived of current at this time, so that relay 75 then releases its armature 77, which thereupon closes circuit at 78, 79 through primary of the second transformer 54. The secondary of this transformer is in parallel with the secondary of transformer 53, whereby transformer 54 is in condition to furnish current to rectifier 62 at the end of the station selecting operation at which time transformers 53 and 55 are inactive. This automatically places rectifier 62 in condition to furnish current for the next selecting operation.

The relay 75 is of the "slow returning" type or constructed so that when deenergized, it will permit its armature to close the 54 transformer primary circuit at 78 after the selecting relay which has just been operated has opened the selector circuit.

The relay 75 furthermore, in the present disclosure is utilized to open the speaker or output circuit of the radio set during the station selecting movements by providing it with the extra, relatively stationary and movable contacts 81, 82, connected by wiring 83 with one terminal 84 of the speaker output of the set and wiring 85 in series with the speaker and the other side 86 of the speaker output. Hence, each time the station selection is being effected, the speaker at the set and the speakers, if any, at the remote control boards are automatically cut off to avoid undesirable sounds and are automatically brought into circuit action at the completion of the station selecting operation.

The operation of the remote control panel will be understood from the foregoing, particularly when Fig. 6 showing the wiring of this remote control is placed above Fig. 7 with the terminals of one wiring diagram in alignment with the terminals of the wiring in the other diagram, it being then seen that the station selector buttons 12a, 13a, etc., on the remote control panel are in parallel respectively with the corresponding push buttons 12, 13, etc., on the radio set. Also it will be noted that the indicator lamps 12", 13", etc. are in parallel with the indicator lamps 12', 13', etc., at the radio set, and so will show simultaneously with those indicator lamps. The so-called "on" switch 17a for starting the radio set from the remote control point is shown connected by the wiring 87 with one side of the rectifier 88, supplied with current from the transformer 88', the return from this rectifier being indicated 89 and shown as extending through an "on" relay 90, Fig. 7. Connected across the lines 87, 89, Fig. 7 in parallel with the remote starting switch 17a, Fig. 6, is the starting or "on" switch 17, which is located at the radio set. The effect therefore of operating either push button 17 or 17a is to close an energizing circuit through relay 90, which thereupon draws its armature 91 into engagement with stationary contact 92 to close its own energizing circuit independently of the push buttons by way of conductor 93, through the normally closed "off" switch 18a, Fig. 6 and conductor 94 through the normally closed "off" switch 18 at the radio set, Fig. 7, and wiring 95, 89, relay 90 to rectifier 88, the opposite side of this rectifier being connected with armature lever 91 by the wiring 87, 96. Interposed in this so-called "on" circuit, there is shown an armature lever 112, Fig. 7 for engagement with a contact 113 in the wiring 96, said armature being under control of a relay 110.

The "on" or circuit closing relay 90 also controls the relatively movable and stationary contacts 97, 98, governing a circuit 99 through primary of the transformer 100, the secondary of this transformer being utilized to furnish current to the tubes of the receiving set. Hence, the operation of either the "on" switch at the radio set or at a remote point serves to close the energizing circuit of the radio receiving set.

The operation of the station selecting time switches 22 will be understood from Fig. 7, in which two of these switches, those for the 6:30 and 7 o'clock time periods are shown connected with the appropriate contact buttons 25 on the main clock timing switch. In this particular instance, the contact arm 27 of the 6:30 time switch is shown turned to B station and the contact arm of the 7 o'clock timing switch is shown turned to the "off" point. As a result, at 6:30 station B will be brought in and at the half hour period ending at 7, the set will be cut off. This follows because of the fact that when the clock contact arm 24 reaches the 6:30 contact button, the 6:30 timing switch will be cut into circuit through the lead 26 and current be thereby conducted through the switch arm 27 to the B station contact at that switch and by connections 101, 102, 103, 70, 64 to the B station relay 45 and by the return wiring 65, to one side of rectifier 62, the other side of said rectifier being connected by the wiring 64a and the extension wiring 104 to the main clock switch 20, which is connected with the movable arm 24 of the clock switch by wiring 105.

The supplemental clock switch 20a on the remote station panel, Fig. 6, is connected in parallel with this main clock switch 20 on the radio set by the wiring 105, 106, Figs. 7 and 6 and return wiring 107, 108, so that when the clock switch at the radio set is left open, the remote control clock switch 20a may be used to turn the clock control or timing mechanism "on" or "off" at will. When in the example supposed, Fig. 7, the half hour contact arm 24 reaches the next contact button 25 at 7 o'clock, current is conducted from that button through connection 26 to lever arm 27 of the 7 o'clock time switch and as this stands on the "off" button, such current continues by conductor 109 to an "off" relay 110 and connections 111, 65 to rectifier 62 and from this rectifier by wiring 64a, 104, switch 20 or 20a to the clock contact arm. This "off" relay 110 when so energized lifts its armature 112 from contact 113 breaking the circuit at this point and thus opening the circuit from rectifier 88, which energized the holding relay 90. The circuit of this holding relay as previously described, is from rectifier 88, continuing through wiring 89, 95, through the normally closed "off" switch 18 and wiring 94 through the remote control normally closed "off" switch 18a, Fig. 6, wiring 93, contact 92, lever 91, wiring 96 to the opposite side of the rectifier, the latter portion of this wiring including the contact 113 and the armature 112, which latter has been lifted by energization of relay 110 to break the circuit. The "off" relay 110 thus exercises a direct control over the relay 90, which normally holds down the armature 97 for closing the circuit through the primary of transformer 100, the latter furnishing the current for the tubes of the set. Consequently, when one of the timing switches is turned to "off", the set will be automatically shut off when the clock contact arm reaches the time of that particular timing switch. Thus by setting these different time switches at "off", the radio set will be automatically shut off when that time is reached.

The so-called holding relay 90, the armature of which is open when the set is not in operation is shown in Fig. 7 with its armature in a closed position, this merely being so for the purpose of more clearly explaining the action of relay 110.

If desired, the radio set may be automatically turned on at any desired time by turning the time switch for that period to the "on" position. These "on" contacts are shown in Fig. 7 connected by wiring 114 with one side of the "on" relay 115, the other side of such relay being connected by wiring 116, 111, 65 with rectifier 62, the return from such rectifier being by wiring 64a, 104, through either clock switch 20 and wiring 105 to the clock contact arm 24 or through switch 28, Fig. 6, by way of wiring 108, 107, 106, 105, to the switch contact arm 24.

When "on" switch 115 is thus energized, it closes a circuit at 117 to energize the holding relay 90 through wiring 118, wiring 89 to rectifier 88 and from this rectifier by wiring 87, 96 to the armature 117a. Consequently, operation of the "on" relay 115 causes the holding relay 90 to be energized, closes the circuit through the set transformer 100.

It will be observed that the set may be turned on by either the "on" switches 17, 17a, at the set or remote control or by the "on" contacts of the clock time system. The "on" switches 17 and 17a are in parallel with each other and in series with a holding relay 90, while the "on" contacts of the station selecting time switches are in series with the "on" relay 115, which controls the circuit through the holding relay 90 by its armature 117a and its contact 117.

The set may be turned off by operation of either the "off" switches 18 or 18a at the set or remote control panel. These switches being in series with each other and with the holding relay 90, so that opening of either switch will break the circuit through said relay, a similar result is effected by the "off" contacts of the clock time system, which are connected as described to energize the "off" magnet 110 for breaking the circuit of the holding relay magnet.

The invention it will be seen provides many possibilities. When the clock system is used, the various time switches may be set to bring in a number of selected radio programs, extending in the present disclosure over a period of 12 hours. The program may be terminated at a predetermined time by turning the switch for that particular time to the "off" position. Thus, the radio set may be caused to bring in the different selected stations for a desired period of time and then be automatically turned off. The program instead of being continuous may be interrupted, if desired, by setting the switch for the time which it is desired to stop the reception at the "off" position and setting the switch for the time, which it is desired to start reception again, at the "on" position. Then at the time of the first switch, the receiving set will be automatically cut off, and after the desired interval of time, the receiving set will be automatically turned on again.

At any time, the action of the automatic program arranging mechanism may be arbitrarily interrupted and other stations be brought in or the set be turned off by simply operating the selector push buttons or the "off" switch on the set itself, or at one of the remote control stations. After thus arbitrarily operating the set, the automatic time control may be allowed to resume the automatic program selecting operation. If at any time it is desired to bring in other stations than those controlled by the push buttons or time switches, the set may be arbitrarily tuned by means of its tuning controls, the slip clutch in the motor drive permitting this operation and the "feeler" mechanism of this clutch enabling the operator to turn the tuning dial back to a proper registration or alignment of the motor driven control shaft and the tuning controls of the set.

When making the station changes, the speaker is automatically cut off and when tuning action is completed, the speaker is again automatically cut into circuit.

The remote control enables a supervisory control or operation of the receiving set at all times, the arbitrary selecting of different desired stations and the shutting off or turning on of the set at will. With this remote control, also, the clock timing mechanism can be cut into or out of service. Also, if a remote speaker is desired, the same can be plugged into the remote panel board or a head set may be plugged into this panel when for instance, it may be desired to test the quality or character of the reception.

The use of multiple prong plugs and sockets for the remote control cable connections, enables one or more remote control panels being quickly connected up with or disconnected from the radio set. The motor, contact segment, drive mechanism relays and push buttons are all relatively simple devices and parts, and can be combined compactly in a comparatively small space, so that the same may be built into the receiving set or form a small outside unit connected up with the tuning control mechanism of the set. Similarly, the clock timing mechanism is of relatively simple construction and may be combined in the radio set as illustrated or made up as a separate unit, for example in combination with the remote control apparatus.

The purpose of the so-called "emergency switches" 19 at the set and 19a at the remote control stations is to restore the actuating mechanism to a so-called normal or "starting" condition after an accidental or incorrect operation of the selector controls, such an accidental or incorrect operation might be the simultaneous actuation of two or more of the selector push buttons. Should this happen, the indicator lights of all the buttons operated will show. This in itself at once notifies the operator of the incorrect actuation of the control buttons. Either one of the emergency switches 19 or 19a, if then operated, will cut the motor feed circuit, at the set in Figs. 1 and 7 or at the remote control stations, Figs. 5 and 6 and the breaking of this motor circuit immediately stops the motor, deenergizes the relays and puts out the signal lights, leaving the apparatus in condition to initiate any desired station selecting operation.

The emergency controls 19, 19a, may be used to correct other conditions in the apparatus, for example, such as might result from operating one of the selector push buttons at a time when the station of that particular selector was being received. In such a case, the relay of that selector circuit would be energized and would hold its circuit closed, indicating the fact by the lighting of the signal lamp for that station. The motor circuit being incomplete at the break in the contact disc would prevent the motor from starting. The signal light may then be put out and the relay be de-energized, so as not to interfere with the next selector operation, by simply operating either the local emergency switch 19 at the set or the emergency control button at any one of the remote control panels.

While the apparatus is shown operated on alternating current, it will be obvious that the same may be operated on direct current, by making the conventional alterations known for changing from alternating to direct current operation.

It will be evident that many changes and modifications may be made in the structure, all within the scope of the claims and in view of this fact, it should be understood that the terms employed herein are used in a descriptive rather than in a limiting sense, except for such limitations as may be required by the state of the art.

What is claimed is:

1. In combination with radio apparatus, having means for adjusting the same to receive different stations, a motor for effecting the different station receiving adjustments of said radio apparatus, means for initiating the operation of said motor, means for automatically stopping the station selecting operation of said motor at various adjusted positions of the radio apparatus, the said motor stopping means including a plurality of relatively shiftable selectively preset devices by which the motor station selecting stopping positions may be varied to set the mechanism for different stations, said pre-setting devices comprising contact arms of different lengths angularly adjustable about a common center and the motor stopping means further including a motor driven commutator operating on said center and having contact rings in line with said arms and with circuit interrupting gaps therein cooperable with said arms in different positions of adjustment of the latter.

2. In combination, a radio receiving set having means for tuning the same to receive different stations, motor means for operating said tuning means for effecting the different station receiving adjustments of said radio set, station selecting switches for effecting different station receiving adjustment operations of said motor means, time switch means for rendering said station selecting switches operative at various selected time periods, a speaker associated with said radio receiving set and means for automatically rendering said speaker inoperative throughout the range of adjustment determined by a particular station selecting switch at a time determined by said time switch means and for rendering the same operative only upon completion of the station receiving adjustment for such predetermined time period.

3. In apparatus of the character disclosed, an electric motor, means for timing the operation of said motor through different ranges of movement, means for selecting the different ranges of movement of said timing mechanism, a power source for the motor and selecting means, the time mechanism including means for disconnecting said power source at the end of the selected timed motor operation, means for automatically reconnecting said power source at the end of such selected motor operation in condition for subsequent timed operations of the motor, said power source and reconnecting means including three transformers, a rectifier supplied with energy from two of said transformers and connected with the selector means, a rectifier supplied with energy from the third transformer and means operated from said second rectifier for controlling supply of energy from one of the first two transformers to the first rectifier.

4. In combination, a radio receiving set having a tuning shaft, a motor geared to drive said shaft, relatively rotatable commutator and brush members, one rotatable with said shaft and the other concentrically mounted and angularly adjustable about the shaft axis, said commutator member having concentric annular conducting and non-conducting portions and said brush member comprising radially spaced brushes in cooperative relation with said concentric annular conducting and non-conducting portions of the commutator, station selecting switches each having a number of different station contacts connected with different cooperating elements of said commutator mechanism and whereby the stopping position of the tuning shaft when operated by the motor will be determined by the angularly set position of one of the adjustable elements of the commutator mechanism connected with a station contact of one of said station selecting switches and a time switch having contacts connected with different station selecting switches and whereby the respective station selecting switches will come into control only at times determined by said time switch.

GEORGE M. ROSENBLUM.